(12) United States Patent
Takai

(10) Patent No.: US 8,461,796 B2
(45) Date of Patent: Jun. 11, 2013

(54) MOTOR DRIVE CIRCUIT FOR DRIVING A SYNCHRONOUS MOTOR

(75) Inventor: Kazumasa Takai, Kagamigahara (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 351 days.

(21) Appl. No.: 12/976,305

(22) Filed: Dec. 22, 2010

(65) Prior Publication Data

US 2011/0156624 A1    Jun. 30, 2011

(30) Foreign Application Priority Data

Dec. 28, 2009    (JP) .................................. 2009-297574

(51) Int. Cl.
*H02P 3/18*    (2006.01)
(52) U.S. Cl.
USPC ...................................... 318/700; 318/400.34
(58) Field of Classification Search
USPC .................... 318/700, 400.34, 685, 696, 459, 318/500
See application file for complete search history.

(56) References Cited

U.S. PATENT DOCUMENTS

| 6,121,736 | A  | * | 9/2000 | Narazaki et al. | 318/400.35 |
| 6,400,107 | B1 | * | 6/2002 | Nakatani et al. | 318/400.21 |
| 6,894,450 | B2 | * | 5/2005 | Cheng et al. | 318/400.09 |
| 6,900,604 | B2 | * | 5/2005 | Kokami et al. | 318/400.33 |

FOREIGN PATENT DOCUMENTS

JP    2007-274760    10/2007

\* cited by examiner

*Primary Examiner* — Rina Duda
(74) *Attorney, Agent, or Firm* — McDermott Will & Emery LLP

(57) ABSTRACT

A coil current detector detects a current component flowing through a coil. A scaling unit scales a drive signal. An induced voltage component extraction unit extracts an induced voltage component by removing the drive signal, scaled by the scaling unit, from the coil current component detected by the current detector. A phase difference detector detects a phase difference between the phase of the drive signal and that of the induced voltage component. A signal adjustment unit adjusts the drive signal so that the phase difference detected by the phase difference detector can be brought close to a target phase difference.

7 Claims, 14 Drawing Sheets

MOTOR DRIVE CIRCUIT FOR DRIVING A SYNCHRONOUS MOTOR

CROSS-REFERENCE TO A RELATED APPLICATION

This application is based upon and claims the benefit of priority from the prior Japanese Patent Application No. 2009-297574, filed on Dec. 28, 2009, the entire contents of which are incorporated herein by reference.

BACKGROUND OF THE INVENTION

1. Field of the Invention

The present invention relates to a motor drive circuit for driving a synchronous motor.

2. Description of the Related Art

There are various kinds of synchronous motors. For example, known synchronous motors are a surface permanent magnet synchronous motor (SPMSM), a permanent magnet (PM) type stepping motor, a variable reluctance (VR) type stepping motor, a hybrid (HB) type stepping motor, a brushless DC motor (BLDCM) and the like. As methods for detecting the rotational position of a synchronous motor, there are a method using a sensor and a method without using the sensor.

As the method without using the sensor, there is a method using the induction power induced by a stator and a rotor (hereinafter referred to as "speed electromotive force" as appropriate). As the method using the speed electromotive force, there are (1) a method where a vector is calculated from the voltage/current of a motor stator and a motor model formula so as to estimate the position and (2) a method where a drive line of the motor is set in a high impedance state for a specific period of time and the speed electromotive voltage is directly detected. In the method (1), the position of the rotor can be estimated over the entire period of the drive periods. In the method (2), the position of the rotor can be estimated at the zero-cross timing of a speed electromotive voltage component detected.

In the method (1), the circuit scale increases and thereby the cost is high. In the method (2), conducting current to a motor must be stopped for a period of time during which the speed electromotive voltage is detected. Hence, the continuity of current is lost. Also, the sampling point to estimate the position of the rotor is restricted to the zero-cross timing of a speed electromotive voltage. In particular, in the case of 2-phase motor, the state of the rotor can be detected for every ¼ electrical angle cycle only, even if the nonconductive periods of each phase are summed up in this method (2).

SUMMARY OF THE INVENTION

A motor drive circuit according to one embodiment of the present invention comprises: a driver unit configured to supply current to a coil of a synchronous motor in response to a drive signal; a coil current detector configured to detect a current component flowing through the coil; a scaling unit configured to scale the drive signal; an induced voltage component extraction unit configured to extract an induced voltage component by removing the drive signal, scaled by the scaling unit, from the coil current component detected by the current detector; a phase difference detector configured to detect a phase difference between the phase of the drive signal and that of the induced voltage component; and a drive signal adjustment unit configured to adjust the drive signal so that the phase difference detected by the phase difference detector is brought close to a target phase difference.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
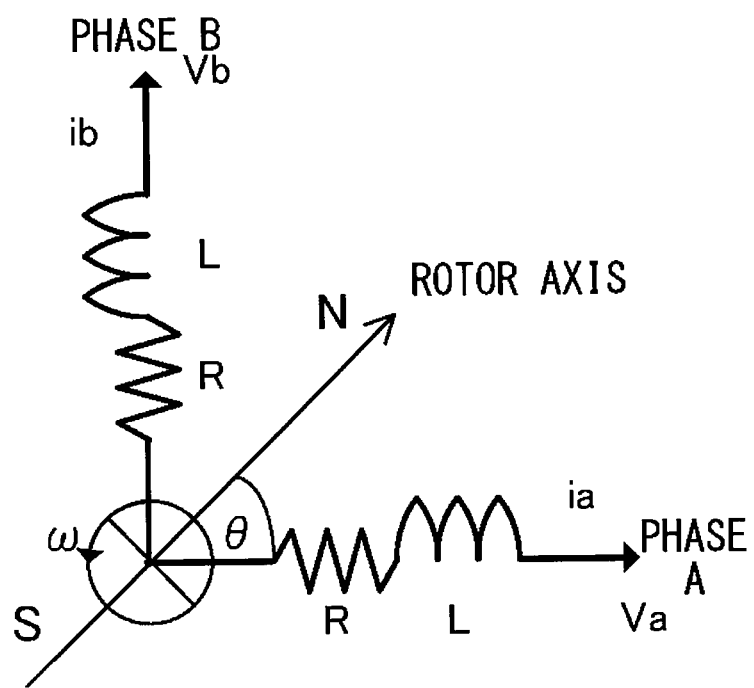
FIG. 1 is an illustration for explaining a relation between a stator and a rotor in a 2-phase permanent magnet synchronous motor (PMSM)

A description will be given of knowledge gained by the inventor of the present invention and used for the embodiments of the present invention before a specific description of the embodiments. The knowledge specifies a relation between a stator and a rotor included in a motor. FIG. 1 is an illustration for explaining a relation between a stator and a rotor in a 2-phase permanent magnet synchronous motor (PMSM). Each symbol denoted in FIG. 1 is defined as follows.

L:=Inductance of each phase.
ia, ib:=Current of each phase.
R:=Direct-current (DC) resistance DCR of each stator.
Va, Vb:=Voltage of each phase.
θ:=Angle formed between a rotor axis and a phase-A axis.
ω:=Angular velocity of a rotor (dθ/dt).

Though the rotor is a permanent magnet, a phase-A axis component Φa is defined by the following Equation (1) if the maximum value of interlinkage magnetic flux occurring during each phase on account of its speed electromotive force is denoted by Φ.

$$\Phi a = \Phi \cos\theta \qquad \text{Equation (1)}$$

Thus, as shown in the following Equation (2), a speed electromotive force Ea induced by the phase-A stator is obtained by differentiating the phase-A axis component Φa with respect to time.

$$Ea = -\omega\Phi \sin\theta \quad \text{Equation (2)}$$

Hence, a voltage equation at phase A is defined by the following Equation (3).

$$Va = (R+pL)Ia + (-\omega\Phi \sin\theta) \quad \text{Equation (3)}$$

where p=d/dt.

A voltage equation at Phase B can be calculated similarly. The voltage equations for phase A and phase B of 2-phase PMSM as shown in FIG. 1 may be combined together and expressed as a single equation (see the following Equation (4)).

$$\begin{bmatrix} Va \\ Vb \end{bmatrix} = (R+pL)\begin{bmatrix} ia \\ ib \end{bmatrix} - \begin{bmatrix} \omega\phi\sin\theta \\ \omega\phi\sin\theta + \frac{\pi}{2} \end{bmatrix} \quad \text{Equation (4)}$$

The above Equation (4) can be transformed to derive the following Equation (5).

$$\begin{bmatrix} ia \\ ib \end{bmatrix} = \left(\frac{1}{R+pL}\right)\begin{bmatrix} Va \\ Vb \end{bmatrix} + \left(\frac{1}{R+pL}\right)\begin{bmatrix} \omega\phi\sin\theta \\ \omega\phi\sin\theta + \frac{\pi}{2} \end{bmatrix} \quad \text{Equation (5)}$$

The first term on the right-hand side of the above Equation (5) indicates the current flowing through a stator coil when the speed electromotive force is zero. For a motor such as a small-size stepping motor whose inductance is comparatively small, Equation (5) with the "pL" component regarded as zero is still valid and practically acceptable. Also, where the effect of the "pL" component relative to the electrical angle cycle to excite the stator coil is relatively small, Equation (5) with the "pL" component regarded as zero is also valid and practically acceptable. In the light of these, the above Equation (5) can be approximated to the following Equation (6).

$$R\begin{bmatrix} ia \\ ib \end{bmatrix} = \begin{bmatrix} Va \\ Vb \end{bmatrix} + \begin{bmatrix} \omega\phi\sin\theta \\ \omega\phi\sin\theta + \frac{\pi}{2} \end{bmatrix} \quad \text{Equation (6)}$$

When the motor is in the stopped state and the stator coil is at steady state under direct-current (DC) energization, the speed electromotive force is zero and the above Equation (6) is expressed by the following Equation (7).

$$\begin{bmatrix} ia \\ ib \end{bmatrix} = \frac{1}{R}\begin{bmatrix} Va \\ Vb \end{bmatrix} \quad \text{Equation (7)}$$

The above Equation (7) indicates that, under the above conditions, the scaling factor by which the voltage value applied to the stator is made to agree with the current value detected from the stator is expressed by the DC resistance DCR of the stator.

The second term on the right-hand side of the above Equation (6) indicates the speed electromotive voltage. Thus, as expressed by the following Equation (8), a speed electromotive voltage Ev is detected in such a manner that a drive signal Ss, which is obtained after the scaling where a drive voltage value S0 of the stator with the motor rotating is multiplied by a scaling factor As, is subtracted from a current value Is detected from the stator with the motor rotating. Here, the scaling factor As is a factor used to scale a current value Idc detected from the stator under DC energization on the same level as a voltage value Vdc applied to the stator under DC energization.

$$Ev = Is - As^*S0 = Is - Ss \quad \text{Equation (8)}$$

Here, the scale of Vdc is the same as that of S0. In other words, Vdc:S0=1:1.

Figure 2:
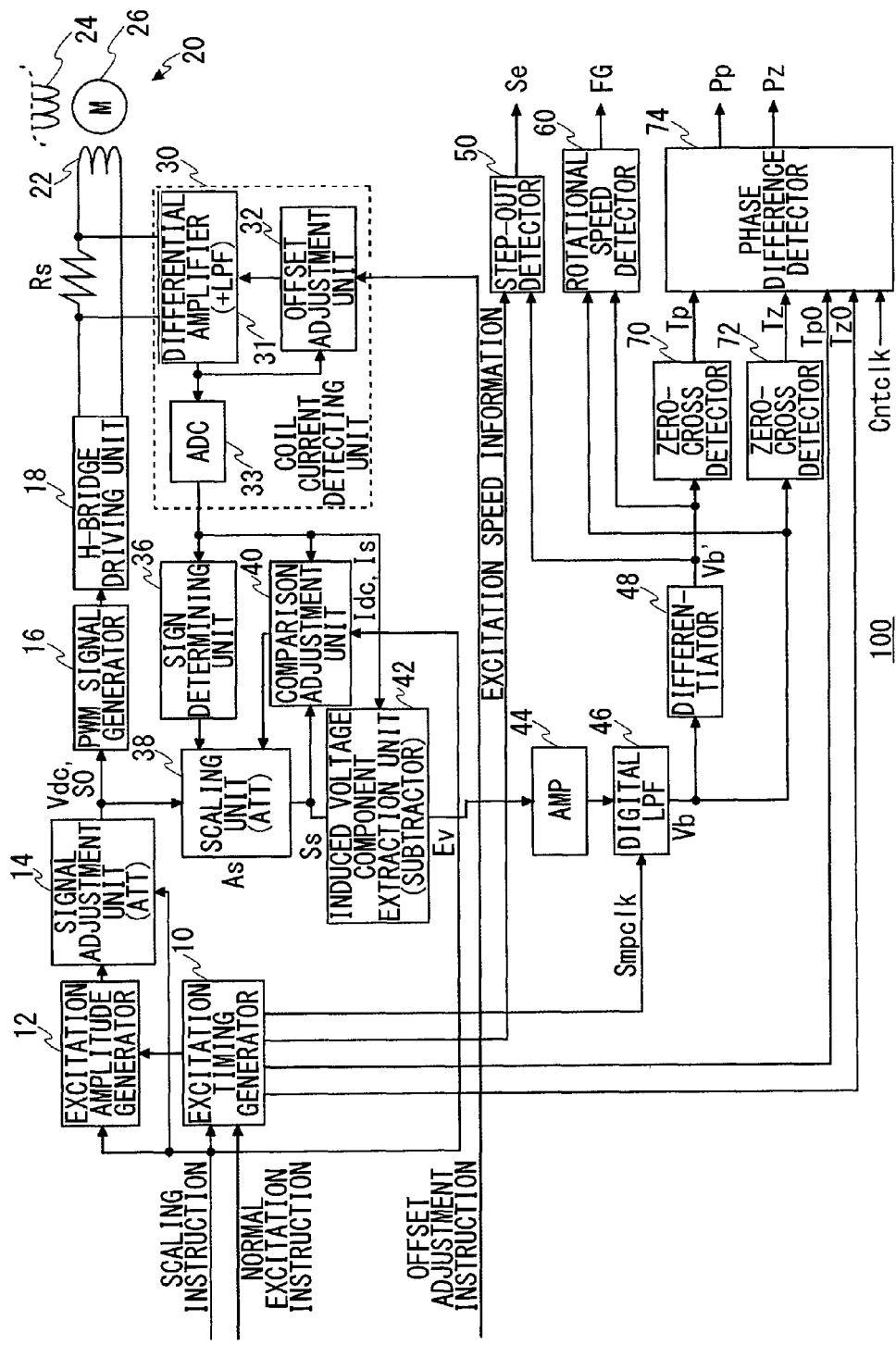
FIG. 2 illustrates a structure of a motor drive circuit according to an embodiment of the present invention.

FIG. 2 illustrates a structure of a motor drive circuit 100 according to an embodiment of the present invention. The motor drive circuit 100 is a circuit for driving a synchronous motor. In the present embodiment, a 2-phase stepping motor 20 (hereinafter referred to simply as "stepping motor 20") is driven. The stepping motor 20 includes two stator coils (called a first coil 22 and a second coil 24) and rotor 26. A stator resistor Rs indicates a DC resistance component of a stator. Note here that a drive system of the first coil 22 is shown in FIG. 2 and a drive system of the second coil 24 is omitted in FIG. 2.

The first coil 22 and the second coil 24 are mutually displaced at an angle of 90 electrical degrees.

The rotor 26 includes a magnetic body such as a permanent magnet, and the stable positions of the rotor 26 are determined according to the magnetic field from the first coil 22 and the second coil 24. The motor drive circuit 100 supplies the alternate currents, whose phases differ mutually by 90 degrees, to the first coil 22 and the second coil 24, respectively. As a result, a difference is caused between the phase of current in the first coil 22 and that in the second coil 24 so as rotate the rotor 26.

Also, the motor drive circuit 100 stops the change in the phase of current with specific timings, so that the rotor 26 can be stopped at specific positions according to the current phases of their timings. With these processings, the rotation of the stepping motor 20 can be controlled.

The motor drive circuit 100 includes an excitation timing generator 10, an excitation amplitude generator 12, a signal adjustment unit 14, a pulse width modulation (PWM) signal generator 16, an H-bridge driving unit 18, a coil current detecting unit 30, a sign determining unit 36, a scaling unit 38, a comparison adjustment unit 40, an induced voltage component extraction unit 42, an amplifier 44, a digital low-pass filter (LPF) 46, a differentiator 48, a step-out detector 50, a rotational speed detector 60, a first zero-cross detector 70, a second zero-cross detector 72, and a phase difference detector 74.

The excitation timing generator 10 receives a scaling instruction or a normal excitation instruction from a not-shown upper-level control apparatus, and generates excitation timings in response to the instruction. The scaling instruction is a command used to select a scaling detection mode in which to detect the scaling factor As, whereas the normal excitation instruction is a command used to select a normal drive mode.

The scaling factor As specifies a relation between a drive signal when the induced voltage occurring in the first coil 22 is zero and a coil current component. More specifically, the drive signal is the voltage value applied to the stator under DC energization, and the coil current component is the current value detected from the stator under DC energization.

The scaling instruction is issued at a power-on of the system. Also, the scaling instruction is issued with an arbitrary timing, while the stepping motor 20 stops and under DC energization.

In the normal drive mode, an excitation signal having a predetermined excitation angle is generated by the excitation timing generator 10 and the excitation amplitude generator 12. For example, sine wave excitation, microstep excitation, 1-2 phase excitation, 2-phase excitation and 1-phase excitation may be employed as the excitation method.

The excitation amplitude generator 12 generates a drive signal or a scaling detection signal having an excitation amplitude according to the excitation timing supplied from the excitation timing generator 10. The signal adjustment unit 14 adjusts the drive signal or the scaling detection signal supplied from the excitation amplitude generator 12. More precisely, the signal adjustment unit 14 adjusts the amplitude of the signal. The adjustment of the amplitude will be described later in detail.

The PWM signal generator 16 converts the drive voltage value S0 supplied from the signal adjustment unit 14, into a PWM signal. The scaling detection voltage value Vdc is directly outputted as a current signal. The H-bridge driving unit 18 supplies current to the stepping motor 20 in response to the signal supplied to the H-bridge driving unit 18. The H-bridge driving unit 18 includes four transistors around the first coil 22 which is disposed in the center thereof. The drive voltage value S0 in a PWM signal format or the scaling detection voltage value Vdc in a DC signal format supplied from the PWM signal generator 16 is inputted to the gate terminals of those transistors. If the drive voltage value S0 in a PWM signal format is inputted thereto, the H-bridge driving unit 18 will supply a current according to the duty ratio of the PWM signal, to the first coil 22. In such a case, the direction and the amount of current to be delivered to the first coil 22 is determined by the PWM signal.

The coil current detecting unit 30 detects a current component flowing through the first coil 22. The coil current detecting unit 30 detects the current component by detecting the voltage across the stator resistor Rs. As a modification, a configuration may be as follows. That is, a resistor for use in the detection of current is provided separately from the stator resistor Rs so that the voltage across this resistor can be detected when the current component is to be detected. The coil current detecting unit 30 includes a differential amplifier 31, an offset adjustment unit 32, and an analog-to-digital converter (ADC) 33.

The differential amplifier 31 amplifies the voltage across the stator resistor Rs by a predetermined gain and then outputs the amplified voltage to the ADC 33. A low-pass filter (LPF) is connected to the output terminal of the differential amplifier 31. Noise contained in an output signal of the differential amplifier 31 is removed by this LPF and then the output signal is inputted to the ADC 33.

The offset adjustment unit 32 adjusts an offset occurring in the differential amplifier 31. For example, the offset adjustment unit 32 detects an output signal of the differential amplifier 31 when the drive current is zero (i.e., the current flowing through the stator resistor Rs is zero), and stores the detected output signal as an offset value. This offset value is added to the input terminal of the differential amplifier 31, so that the offset occurring in the differential amplifier 31 is canceled. Note here that the offset adjustment unit 32 carries out the processing of detecting the offset value, based on an offset value adjustment instruction given from the not-shown aforementioned control apparatus.

The ADC 33 converts an analog signal outputted from the differential amplifier 31, into a digital signal. The digital signal is a signal indicating either the coil current component Is, at the time the motor is rotating, detected by the coil current detecting unit 30 or the coil current component Idc, at the time of scaling detection, detected by the coil current detecting unit 30. The sign determining unit 36 determines the sign (positive or negative) of the signal inputted from the ADC 33 and supplies the sign to the scaling unit 38. Determining the sign results in the detection of the direction of current flowing through the stator resistor Rs.

The scaling unit 38 stores the above-described scaling factor As. In the normal drive mode, the scaling unit 38 scales the drive voltage value S0 (hereinafter denoted as "drive signal S0") outputted from the signal adjustment unit 14, using the above-described scaling factor As. More specifically, the scaling unit 38 generates a "drive signal after the scaling" Ss, by multiplying the drive signal S0 by the scaling factor As, and supplies the "drive signal after the scaling" Ss to the induced voltage component extraction unit 42.

In the scaling detection mode, the scaling unit 38 supplies the value (Vdc*As) to the comparison adjustment unit 40. Here, Vdc*As is a value obtained such that the scaling detection voltage Vdc outputted from the signal adjustment unit 14 is multiplied by the scaling factor As. In the scaling detection mode, the comparison adjustment unit 40 compares the value (Vdc*As) supplied from the scaling unit 38 and the coil current component Idc, at the time of scaling detection, supplied from the coil current detecting unit 30. Then the comparison adjustment unit 40 computes a scaling factor As by which to match Vdc*As and Idc, and sets the thus computed scaling factor As in the scaling unit 38. This scaling factor As is adjusted individually in accordance with the direction of current flowing through the first coil 22. In other words, two kinds of scaling factors As (i.e., positive and negative scaling factors) are set. This is to dissolve the difference in the direct-current (DC) characteristics in the motor drive circuit 100.

The induced voltage component extraction unit 42 extracts an induced voltage component by removing the "drive signal after the scaling" Ss, from the motor-rotating coil current component Is detected by the coil current detecting unit 30. Here, the induced voltage component is extracted as the speed electromotive voltage component Ev. In other words, since the "drive signal after the scaling" Ss indicates a current component detected from the first coil 22 in a state where the induced current is not generated, the induced current component can be calculated by subtracting the "drive signal after the scaling" Ss from the actually detected coil current component.

As described above, in the normal drive mode, the speed electromotive voltage component Ev can be continuously detected by calculating the difference between the drive signal Ss, generated by multiplying the drive signal S0 by the scaling factor As, and the motor-rotating coil current component Is.

The amplifier 44 amplifies the speed electromotive voltage component Ev outputted from the induced voltage component extraction unit 42, by a predetermined gain. The digital LPF 46 removes a high-frequency noise from the speed electromotive voltage component Ev amplified by the amplifier 44. A sampling clock Smpclk is supplied to the digital LPF 46 from the excitation timing generator 10. The digital LPF 46 can adjust a cutoff frequency based on the sampling clock Smpclk. The excitation timing generator 10 determines the excitation speed, based on rotational speed information contained in the normal excitation instruction, and generates the sampling clock Smpclk according to the thus determined excitation speed. Hence, the receiving of the sampling clock Smpclk allows the digital LPF 46 to set the cutoff frequency to an optimal value according to the excitation speed.

The speed electromotive voltage component Vb outputted from the digital LPF 46 is inputted to the differentiator 48, the second zero-cross detector 72 and the rotational speed detector 60. Note that, hereinafter, the speed electromotive voltage component Ev having passed through the amplifier 44 is denoted by the speed electromotive voltage component "Vb".

The differentiator 48 differentiates the speed electromotive voltage component Vb so as to output a speed electromotive voltage component differential value Vb'. This differentiation causes the phase of the speed electromotive voltage component Vb to lead by 90 degrees. The speed electromotive voltage component differential value Vb' generated by the differentiator 48 is inputted to the step-out detector 50 and the first zero-cross detector 70.

The step-out detector 50 detects the loss-of-synchronization of the stepping motor 20, based on excitation speed information supplied from the excitation timing generator 10 and the speed electromotive voltage component differential value Vb' supplied from the differentiator 48 so as to output a step-out detection signal Se. This detection processing performed by the step-out detector 50 will be described later in detail.

The rotational speed detector 60 detects the rotational speed of the stepping motor 20, based on the speed electromotive voltage component Vb supplied from the digital LPF 46 and the speed electromotive voltage component differential value Vb' supplied from the differentiator 48 so as to output a rotational speed signal FG. This detection processing performed by the rotation speed detector 60 will be described later in detail.

The first zero-cross detector 70 detects a zero-cross point of the speed electromotive voltage component differential value Vb' supplied from the differentiator 48 and outputs a first zero-cross signal Tp to the phase difference detector 74. The second zero-cross detector 72 detects a zero-cross point of the speed electromotive voltage component Vb supplied from the digital LPF 46 and outputs a second zero-cross signal Tz to the phase difference detector 74.

The phase difference detector 74 detects the phase difference between the phase of the aforementioned drive signal and that of the speed electromotive voltage component, and outputs a first phase difference signal Pp and a second phase difference signal Pz. A first flag signal Tp0, a second flag signal Tz0 and a count clock Cntclk, in addition to the aforementioned first zero-cross signal Tp and second zero-cross signal Tz, are supplied to the phase difference detector 74. The first flag signal Tp0 and the second flag signal Tz0 are signals indicating two different kinds of excitation timings whose phases are different from each other by 90 degrees, and are supplied from the excitation timing generator 10.

For example, the first flag signal Tp0 may be a signal indicating the timings when the excitation angles are 90 degrees and 270 degrees, whereas the second flag signal Tz0 may be a signal indicating the timings when the excitation angles are 0 degree, 180 degrees and 360 degrees. In such a case, the phase difference detector 74 measures the time differences between the timings, indicated by the first flag signal Tp0, when the excitation angles are 90 degrees and 270 degrees and the zero-cross timings indicated by the first zero-cross signal Tp, at the respective timings, and detects the phase differences at the respective excitation angles. This detection result is outputted as the first phase difference signal Pp. Similarly, the phase difference detector 74 measures the time differences between the timings, indicated by the second flag signal Tz0, when the excitation angles are 0 degree, 180 degrees and 360 degrees and the zero-cross timings indicated by the second zero-cross signal Tz, at the respective timings, and detects the phase differences at the respective excitation angles. This detection result is outputted as the second phase difference signal Pz.

If the stepping motor 20 is rotating under an ideal condition, the speed electromotive voltage component Ev will be detected as a sine wave. Due to the characteristics specific to the stepping motor, the phase of drive voltage and the phase of drive current can be regarded approximately identical to each other in terms of the electrical angular frequency. Using this property, observing the speed electromotive voltage component Ev using the drive signal after the scaling Ss as a reference enables the detection of the state of the rotor 26. Since the drive signal before the scaling S0 and the drive signal after the scaling Ss are signals generated in the motor drive circuit 100, it is easy to produce the flag signals indicating the timings when the excitation angles are 0 degree, 90 degrees, 180 degrees, 270 degrees and 360 degrees. It is also easy to keep track of or recognize the excitation cycles.

Figure 3:
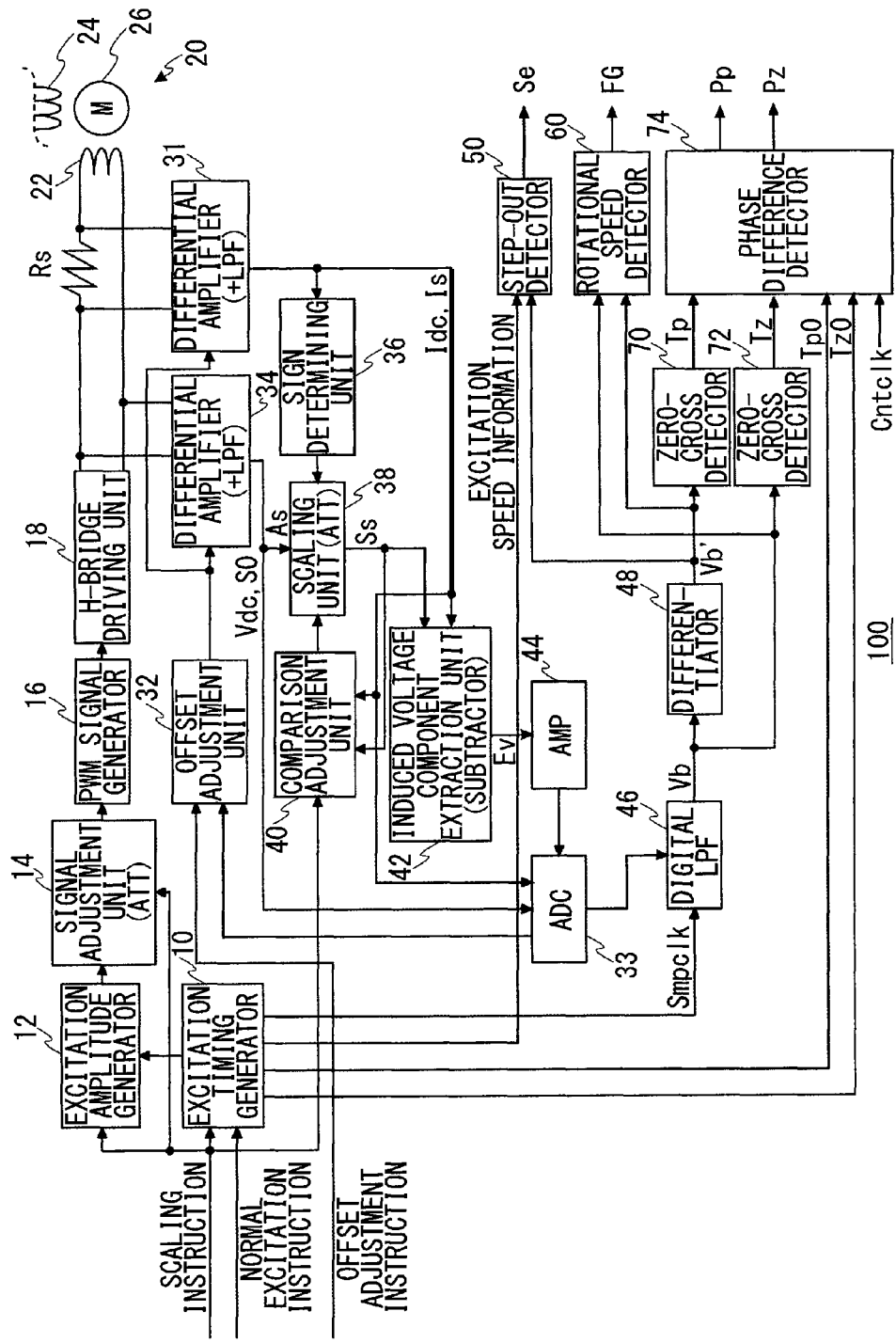
FIG. 3 illustrates a structure of a motor drive circuit according to a first modification of an embodiment of the present invention.

FIG. 3 illustrates a structure of a motor drive circuit 100 according to a first modification of the embodiment of the present invention. The first modification is configured such that the drive signal S0 is detected as an analog value and the subtraction processing of the motor-rotating coil current component Is and the "drive signal after the scaling" Ss is performed in the analog domain. Also, the setting of the scaling factor As by the comparison adjustment unit 40 is done in the analog domain. In contrast thereto, the motor drive circuit 100 as shown in FIG. 2 performs these processings in the digital domain.

In the first modification, a differential amplifier 34 is added. The differential amplifier 34 amplifies the voltage applied across the first coil 22 from the H-bridge driving unit 18, at a predetermined gain and then outputs the amplified voltage to the scaling unit 38. A low-pass filter (LPF) is connected to the output terminal of the differential amplifier 34. Noise contained in an output signal of the differential amplifier 34 is removed by this LPF and then the output signal is supplied to the scaling unit 38.

In the first modification, the output signal of the differential amplifier 31 is supplied to the sign determining unit 36, the comparison adjustment unit 40 and the induced voltage component extraction unit 42 without passing through the ADC 33. The output signal of the differential amplifier 31 and the output signal of the differential amplifier 34 can also be directly outputted to the ADC 33. Also, the output signal of the ADC 33 can be outputted to the offset adjustment unit 32; the offset adjustment unit 32 can detect offset values of the differential amplifier 31 and the differential amplifier 34, respectively, through these paths.

The induced voltage component extraction unit 42 outputs the speed electromotive voltage component Ev in an analog signal format. Then the speed electromotive voltage component Ev is amplified by the amplifier 44 and converted into the speed electromotive voltage component Vb in a digital signal format by the ADC 33.

Figure 4:
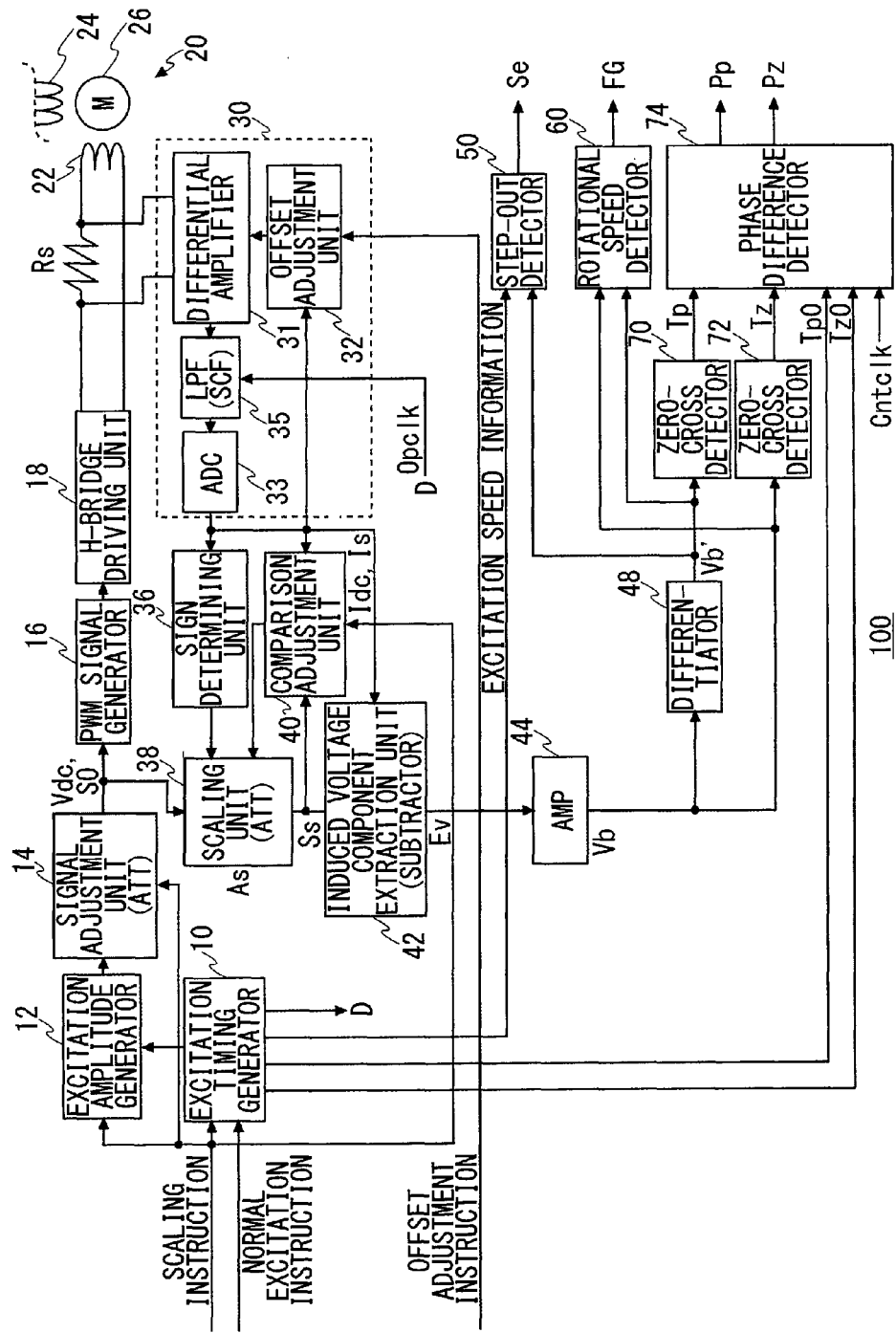
FIG. 4 illustrates a structure of a motor drive circuit according to a second modification of an embodiment of the present invention.

FIG. 4 illustrates a structure of a motor drive circuit 100 according to a second modification of the embodiment of the present invention. In the second modification, a switched-capacitor low-pass filter (LPF) 35 is connected to the output terminal of the differential amplifier 31, so that the digital LPF 46 is removed.

The switched-capacitor LPF 35 can vary the cutoff frequency by its operation clocks. Thus, the cutoff frequency can be constantly controlled at an optimal value in response to the drive frequency of the stepping motor 20. In the second modification, the removal of high-frequency noise is done by the switched-capacitor LPF 35 as compared with the removal thereof by the digital LPF 46 as shown in FIG. 2. The switched-capacitor LPF 35 adjusts the operation clocks in response to operation clocks Opclk supplied from the excitation timing generator 10 so as to adjust the cutoff frequency to the optimal value.

Figure 5:
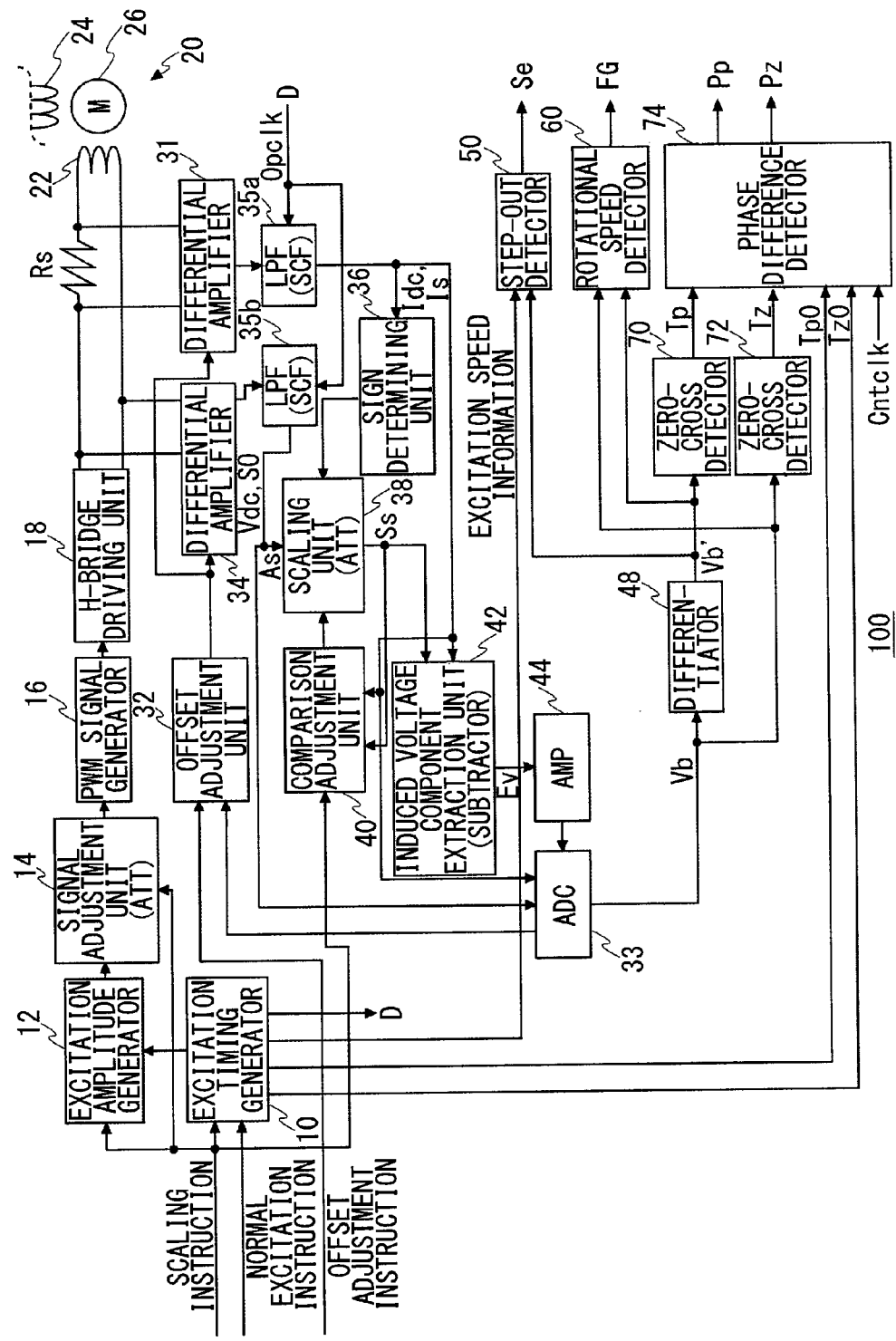
FIG. 5 illustrates a structure of a motor drive circuit according to a third modification of an embodiment of the present invention.

FIG. 5 illustrates a structure of a motor drive circuit 100 according to a third modification of the embodiment of the present invention. The third modification is configured such that the first modification and the second modification are combined together. In other words, a differential amplifier 34 is added; a switched-capacitor low-pass filter (LPF) 35*a* is connected to the output terminal of the differential amplifier 31; a switched-capacitor low-pass filter (LPF) 35*b* is connected to the output terminal of the differential amplifier 34; and the digital LPF 46 is removed.

The differential amplifier 34 amplifies the voltage applied across the first coil 22 from the H-bridge driving unit 18, at a predetermined gain and then outputs the amplified voltage to the scaling unit 38 via the switched-capacitor LPF 35*b*. The switched-capacitor LPF 35*b* removes the high-frequency noise contained in the output signal of the differential amplifier 34. The switched-capacitor LPF 35*a* and the switched-capacitor LPF 35*b* adjust the operation clocks in response to the operation clocks Opclk supplied from the excitation timing generator 10 so as to adjust the cutoff frequency to the optimal value.

Similar to the first modification, the third modification is configured such that the drive signal S0 is detected as an analog value and the subtraction processing of the motor-rotating coil current component Is and the "drive signal after the scaling" Ss is performed in the analog domain. Also, the setting of the scaling factor As by the comparison adjustment unit 40 is done in the analog domain.

Figure 6:
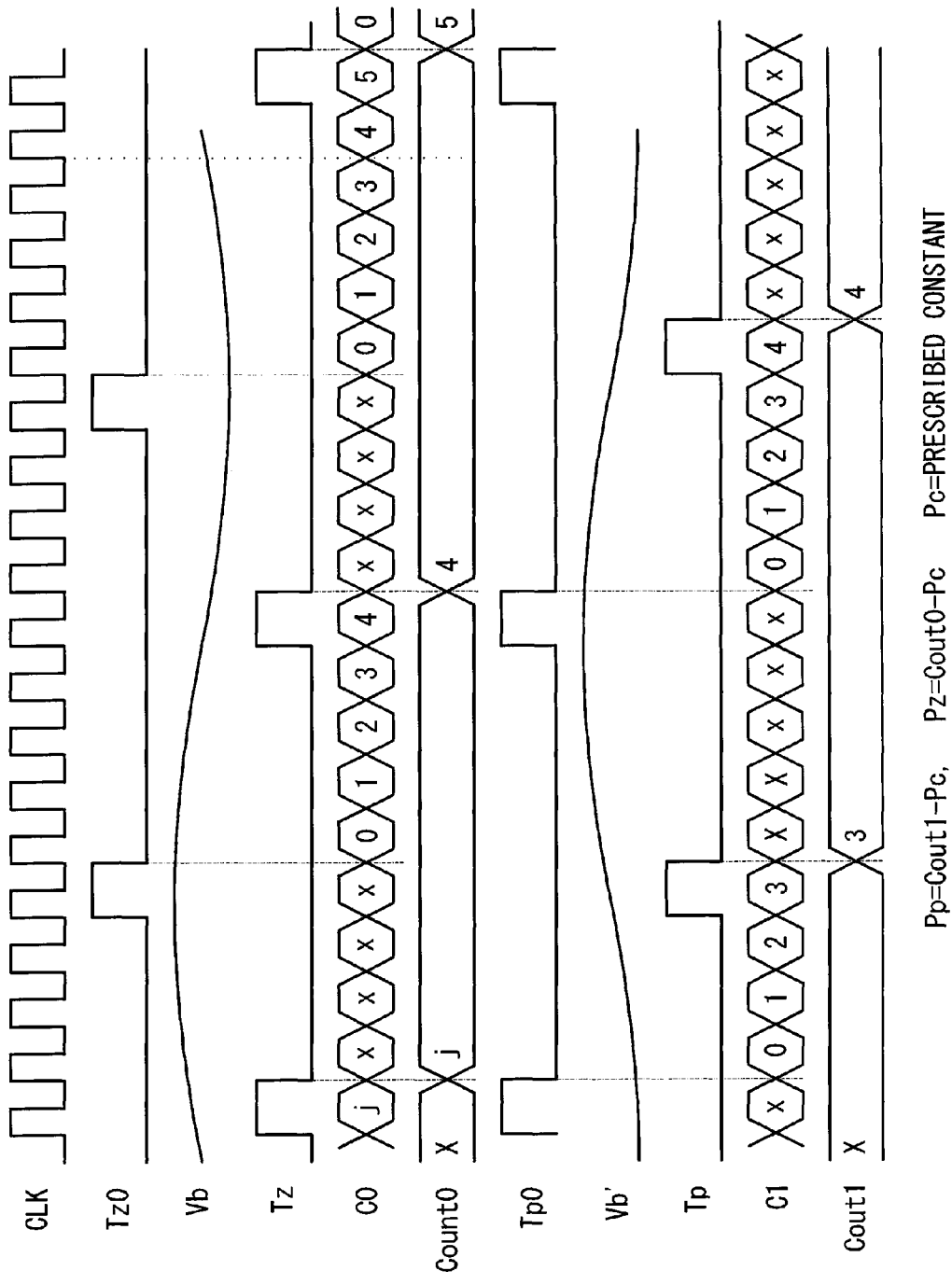
FIG. 6 is a timing chart showing an exemplary operation of a phase difference detector.

FIG. 6 is a timing chart showing an exemplary operation of the phase difference detector 74. The excitation timing generator 10 produces two kinds of excitation timings in order to supply the drive signals, whose phases differ mutually by 90 degrees, to the first coil 22 and the second coil 24 included in the stepping motor 20. The first flag signal Tp0 and the second flag signal Tz0 are generated, based on these two kinds of excitation timings. The frequency of the first flag signal Tp0 and the second flag signal Tz0 is twice as high as that of the drive signal, and the frequency thereof has the same frequency as that of the rotational speed signal FG.

The phase difference detector 74 has two counters (not shown) and a not-shown subtractor. A first counter counts a period from a falling edge of the first flag signal Tp0 to a falling edge of the first zero-cross signal Tp, in synchronism with the clock CLK. Then, a first count value C1 in the first counter at the time of a fall of the first zero-cross signal Tp is outputted as a first output count value Cout1. Similarly, a second counter counts a period from a falling edge of the second flag signal Tz0 to a falling edge of the second zero-cross signal Tz, in synchronism with the clock CLK. Then, a second count value C0 in the second counter at the time of a fall of the second zero-cross signal Tz is outputted as a second output count value Cout0.

To compensate for an offset component occurring in the phase difference detector 74, the subtractor subtracts a predetermined constant Pc, from the first output count value Cout1 supplied from the first counter and thereby generates the first phase difference signal Pp. Similarly, the subtractor subtracts a predetermined constant Pc, from the second output count value Cout0 supplied from the second counter and thereby generates the second phase difference signal Pz.

Figure 7:
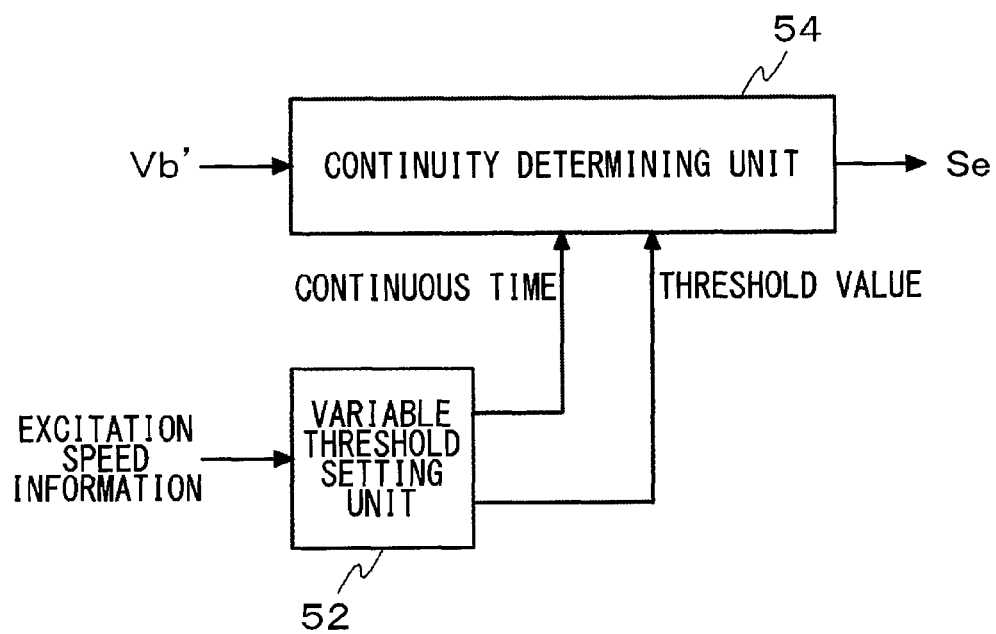
FIG. 7 illustrates a structure of a step-out detector.

FIG. 7 illustrates a structure of the step-out detector 50. The step-out detector 50 detects the loss of synchronization, using the principle that the stepping motor 200 comes to a stop when the rotation synchronization is lost in the stepping motor 200, and then the speed electromotive voltage is lost. The step-out detector 50 includes a variable threshold setting unit 52 and a continuity determining unit 54. Excitation speed information is supplied to the variable threshold setting unit 52 from the excitation timing generator 10. The variable threshold setting unit 52 determines a decision continuous time and a decision threshold value, based on the excitation speed information, and sets them in the continuity determining unit 54. The continuity determining unit 54 detects the loss of synchronization by determining whether the speed electromotive voltage component differential value Vb' supplied from the differentiator 48 stays within a predetermined range for a predetermined length of time or longer or not.

Figure 8:
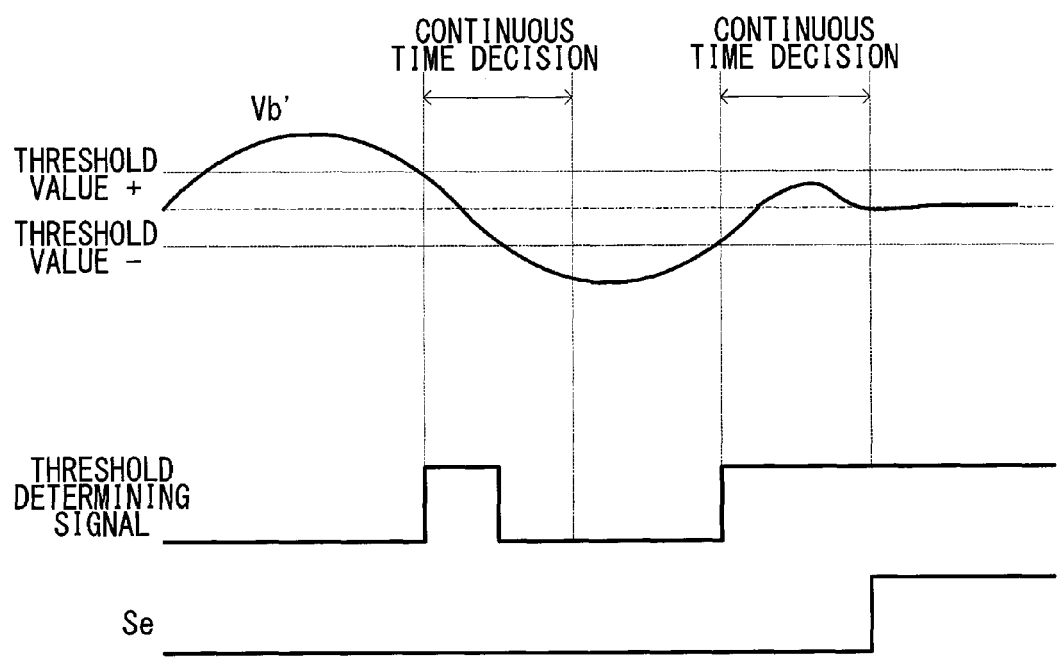
FIG. 8 is a timing chart showing an exemplary operation of a continuity determining unit.

FIG. 8 is a timing chart showing an exemplary operation of the continuity determining unit 54. As shown in FIG. 8, the continuity determining unit 54 sets a threshold determining signal to a high level if the speed electromotive voltage component differential value Vb' lies within a range specified by a positive-side threshold value (+) and a negative-side threshold value (−) which are located symmetrically with respect to zero as the reference. Then, if the speed electromotive voltage component differential value Vb' stays within the range even after a continuous length of time (namely, if the threshold determining signal continues to stay high), the continuity determining unit 54 will determine that the loss of synchronization has occurred and then set a step-out detection signal Se to a high level.

Since the speed electromotive voltage component differential value Vb' is a differential value of the speed electromotive voltage component Vb, its amplitude component is proportional to the rotational speed of the stepping motor 20. Also, the frequency of the speed electromotive voltage component differential value Vb' agrees with the rotational frequency. Thus, the variable threshold setting unit 52 acquires, in real time, the excitation speed information from the excitation timing generator 10, so that the decision continuous time and the decision threshold value can be set to optimal values. As a result, the loss of synchronization in various states ranging from a low-speed rotation to a high-speed rotation can be detected with accuracy.

Figure 9:
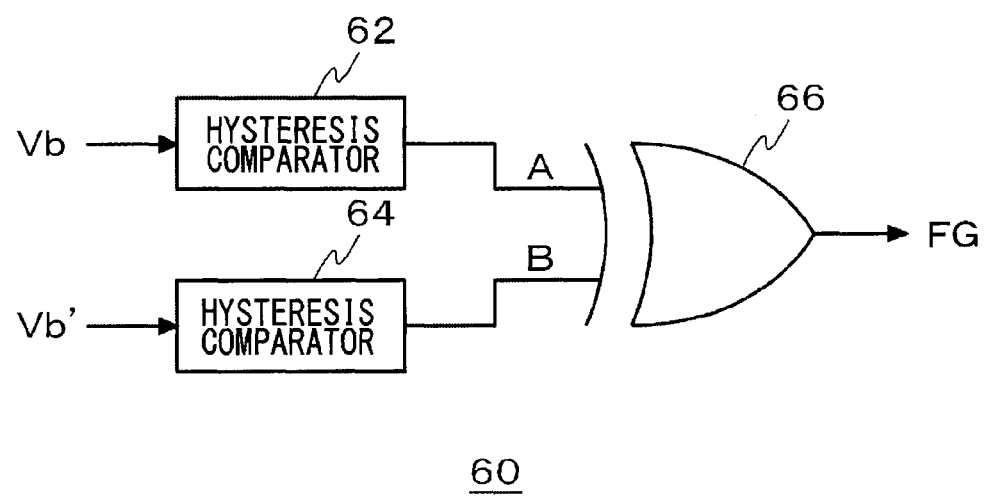
FIG. 9 illustrates a structure of a rotational speed detector.

FIG. 9 illustrates a structure of the rotational speed detector 60. The rotational speed detector 60 includes a first hysteresis comparator 62, a second hysteresis comparator 64, and an exclusive-OR circuit 66. The speed electromotive voltage component Vb is inputted to the first hysteresis comparator 62. The speed electromotive voltage component differential value Vb' is inputted to the second hysteresis comparator 64.

Figure 10:
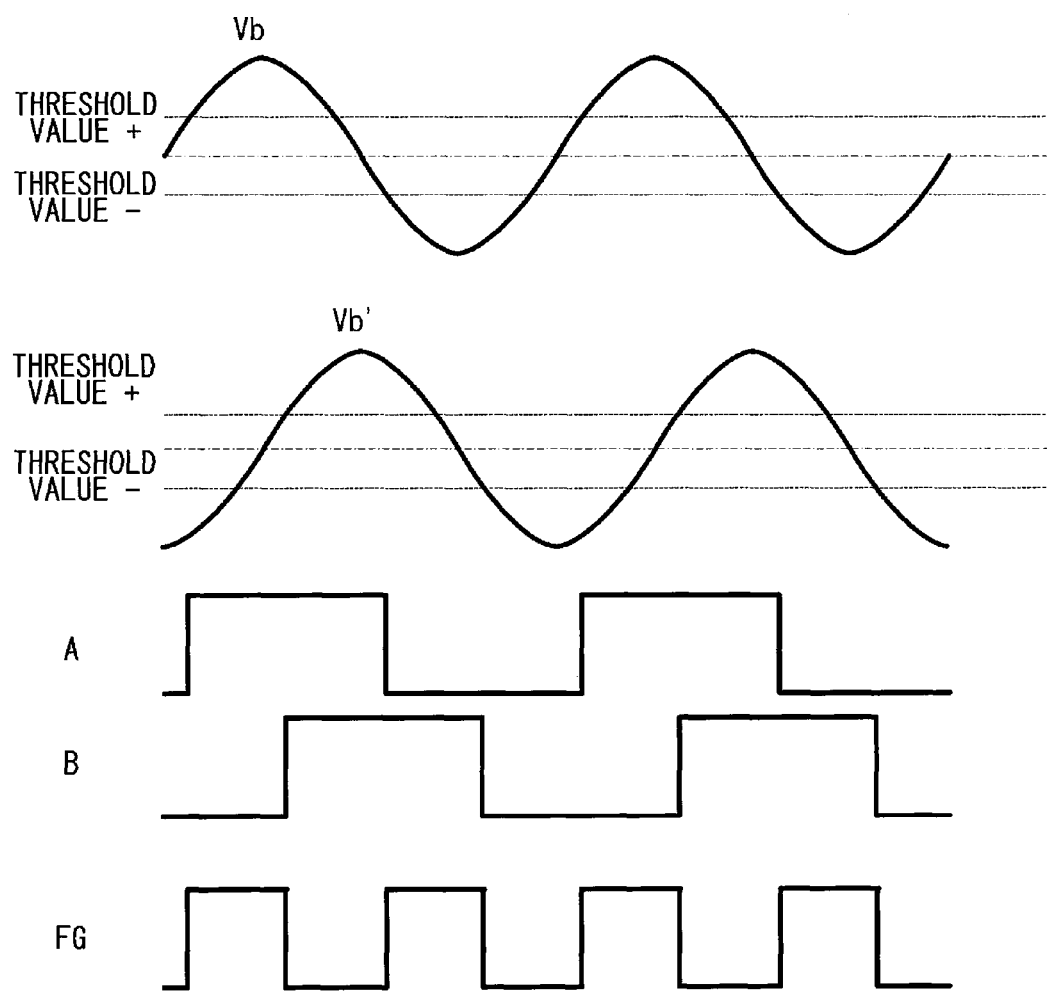
FIG. 10 is a timing chart showing an exemplary operation of a rotational speed detector.

FIG. 10 is a timing chart showing an exemplary operation of the rotational speed detector 60. As shown in FIG. 10, a positive-side threshold value (+) and a negative-side threshold value (−) which are located symmetrically with respect to zero as the reference are inputted to the first hysteresis comparator 62, and another positive-side threshold value (+) and another negative-side threshold value (−) which are located symmetrically with respect to zero as the reference are inputted to the second hysteresis comparator 64. The first hysteresis comparator 62 sets a determining signal A to a high level if the speed electromotive voltage component Vb exceeds the positive-side threshold value (+), and sets the determining signal A to a low level if it falls below the negative-side threshold value (−). The level of the determining signal A is kept intact if the speed electromotive voltage component Vb lies within the range between the positive-side threshold value (+) and the negative-side threshold value (−). Similarly, the second hysteresis comparator 64 sets a determining signal B to a high level if the speed electromotive voltage component differential value Vb' exceeds the positive-side threshold value (+), and sets the determining signal B to a low level if it falls below the negative-side threshold value (−). The level of the determining signal B is kept intact if the speed electromotive voltage component differential value Vb' lies within the range between the positive-side threshold value (+) and the negative-side threshold value (−).

The determining signal A and the determining signal B, whose phases differ mutually by 90 degrees from each other, are outputted from the first hysteresis comparator 62 and the second hysteresis comparator 64, respectively, and are inputted to the exclusive-OR circuit 66. The exclusive-OR circuit 66 executes XOR of the determining signal A and the determining signal B and outputs the operation result as the rotational speed signal FG. In this manner, the rotational speed signal FG, whose frequency is twice as high as the speed electromotive voltage component Vb and the speed electromotive voltage component differential value Vb' is obtained. Measuring the cycle of this rotational speed signal FG allows keeping track of or recognizing the change of speed every half cycle of the speed electromotive voltage component Vb. The rotational direction of the stepping motor 20 can also be detected by determining the phase relation of the rotational speed signal FG generated at each phase of the stepping motor 20. Note here that the aforementioned positive-side threshold value (+) and negative-side threshold value (−) used in the step-out detector 50 may be also used as those used in the rotational speed detector 60.

Figure 11:
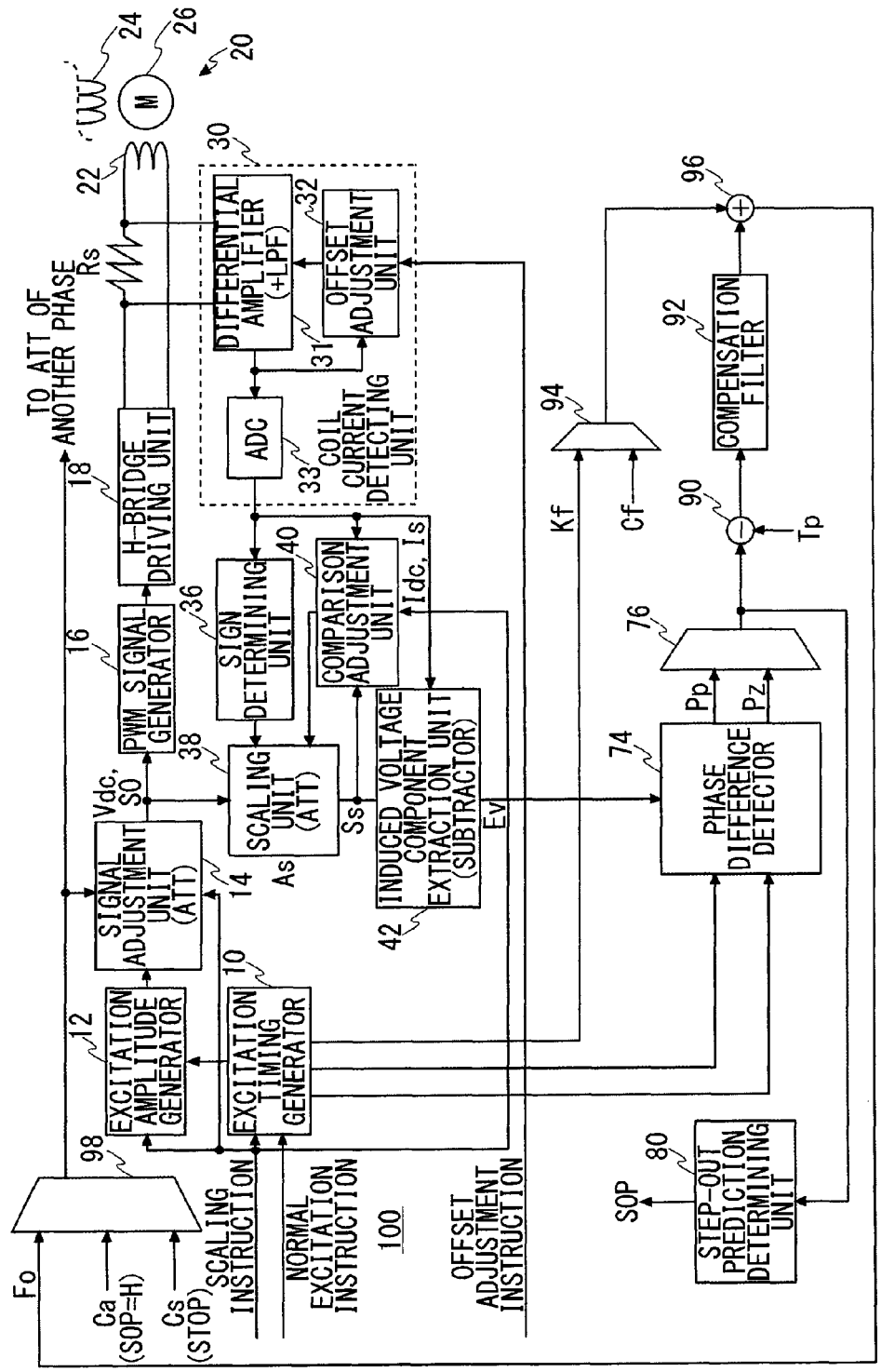
FIG. 11 illustrates a structure of a motor drive circuit where a feedback loop is added to the motor drive circuit of FIG. 2.

FIG. 11 illustrates a structure of a motor drive circuit 100 where a feedback loop is added to the motor drive circuit 100 shown in FIG. 2. For simplicity, the amplifier 44, the digital LPF 46, the differentiator 48, the step-out detector 50, the rotational speed detector 60, the first zero-cross detector 70 and the second zero-cross detector 72 are omitted in FIG. 11.

The drive circuit 100 shown in FIG. 11 is configured such that a selector 76, a subtractor 90, a compensation filter 92, a selector 94, an adder 96, a selector 98 and a step-out prediction determining unit 80 are added to the motor drive circuit 100 of FIG. 2.

The selector 76 selects alternately the first phase difference signal Pp and the second phase difference signal Pz outputted from the phase difference detector 74 and outputs the selected signal Pp or Pz. This configuration enables the phase difference signals to be combined into a single system. The subtractor 90 subtracts the phase difference signal inputted from the selector 76, from a predetermined target phase difference Tp so as to generate a deviation signal.

The compensation filter 92 filters out the deviation signal inputted from the subtractor 90 and thereby generates a control signal. For example, when the compensation filter 92 is comprised of a proportional-integral (PI) compensator, the PI compensator multiplies the deviation signal by a proportional gain Kp and an integral gain Ki/s, respectively, and the calculation results are added up so as to generate the control signal. While the stepping motor 20 stops, the PI compensator basically continues to hold the previous value but clears the previous value at a specific moment or timing and continues to operate. The specific moment or timing meant here includes the moment immediately after a system reset, a restart timing after a loss-of-synchronization, and so forth. The PI compensator continues to operate while the stepping motor 20 is in operation.

The signal adjustment unit 14 adjusts the drive signal S0, based on the control signal F0 generated by the compensation filter 92 or the control signal F0 where an offset value has been added by the adder 96. That is, the signal adjustment unit 14 adjusts it so that the phase difference detected by the phase difference detector 74 can be brought close to the target phase difference Tp. More specifically, the amplitude of the drive signal S0 is adjusted. The amplitude of the drive signal S0 is attenuated if the phase of the speed electromotive voltage component Ev is to be delayed, whereas the amplitude thereof is increased if the phase thereof is to be advanced.

Note here that the object to be controlled is the phase difference. The phase difference varies depending on the drive current and therefore the feedback loop for the control is a current loop. Though the phase difference is the difference in phase between the "drive signal after the scaling" Ss and the speed electromotive voltage component Ev, the phase difference between the drive voltage and the drive current may be regarded as zero, as described earlier, for the stepping motor 20 depending on the operational conditions. For the stepping motor 20, this is because the operation is basically so performed that the stator current reaches a steady state for each step.

The target phase difference Tp is set in such a range that the phase of the speed electromotive voltage component Ev leads the phase of the "drive signal after the scaling" Ss by 90 degrees to 0 degree. The target phase difference Tp is determined within the range depending on a system applied. In practice, an angle of 0 degree with a predetermined margin allowed is set in most cases.

The smaller the phase difference, the more the drive current is lowered, so that the power consumption can be reduced. However, in such a case, the precision of stop position per step of the stepping motor 20 degrades. In other words, the power consumption and the precision of stop position are in a trade-off relation with each other. Also, the maximum efficiency point of the stepping motor 20 is a position where the phase of the current is advanced by 90 degrees relative to the rotor 26. However, since in the present embodiment the stepping motor 20 runs at the minimum point of the total power consumption at the cost of a reduced efficiency, the target phase difference is set within a range of +90 degrees to 0 degree.

If the target phase difference is less than +90 degrees, the basic operation condition of the stepping motor 20 will not be technically met. Here, the base operation condition of the stepping motor 20 is that the stator current reaches the steady state per step. In the light of this, when the rotor 26 included in the stepping motor 20 has moved from a certain stop position (point A) to the next stop position (point B), the signal adjustment unit 14 adjusts the drive signal so that the phase difference is brought close to the target phase difference; while the rotor 26 stops at a stop position, the drive signal adjustment unit 14 ceases to adjust the drive signal. That is, the length of time during which the stepping motor 20 runs on a low power consumption is restricted to the period between the start of movement from the point A toward the point B and an instant immediately before reaching the point B.

The selector 98 selects and outputs the control signal F0 fed back when the rotor 26 is moving from a certain stop position (point A) to the next stop position (point B). While the rotor 26 stops, the selector 98 selects and outputs a stop set value Cs. The stop set value Cs is set in advance in order to assure a sufficient degree of precision of stop position. The stop set value Cs may be a fixed value or a value varying in response to the excitation speed. It is to be noted here that the switching control of the selector 98 is performed by the not-shown upper-level control apparatus.

The selector 94 selects a first offset value Kf or a second offset value Cf and outputs it to the adder 96. The first offset value Kf is a value that varies in accordance with the excitation speed information so that a stable operation can be achieved even at the time the rotational speed of the stepping motor 20 is switched. The first offset value Kf is controlled in a manner such that the first offset value Kf becomes large if the excitation speed is high and such that Kf becomes small if the excitation speed is low. This is because, under the same load, a larger torque is required for a higher speed whereas a small toque suffices for a low speed.

The second offset value Cf may be set to an arbitrary value. The second offset value Cf is selected when the stepping motor 20 is to be started from an arbitrary drive amount at a power-on. Thus, the phase difference can be made to converge faster to the target phase difference faster after the start of operation. The switching control of the selector 94 is also performed by the not-shown upper-level control apparatus.

The adder 96 adds the offset value inputted from the selector 94, to the control signal inputted from the compensation filter 92 and outputs this addition result to the selector 98.

The step-out prediction determining unit 80 compares the differential value of the phase difference detected by the phase difference detector 74 with a detection threshold value for use in the prediction of loss-of-synchronization, and predicts the occurrence of loss-of-synchronization. The step-out prediction determining unit 80 will be described later in detail.

The motor drive circuit 100 detects the phase difference of the first coil 22 and adjusts the drive signal S0 of the first coil 22 so that the phase difference is brought close to the target phase difference Tp. At the same time, the motor drive circuit 100 adjusts the drive signal of the coil of another phase (the second coil 24 in the present embodiment). In other words, the control signal F0 is also supplied to the signal adjustment unit (ATT) of another phase via the selector 98. As a result, the current ratio between the first coil 22 and the second coil 24 can be kept. An arrangement may be such that the signal adjustment unit 14 adjusts both the drive signal of the first coil 22 and the drive signal of the second coil 24.

Figure 12:
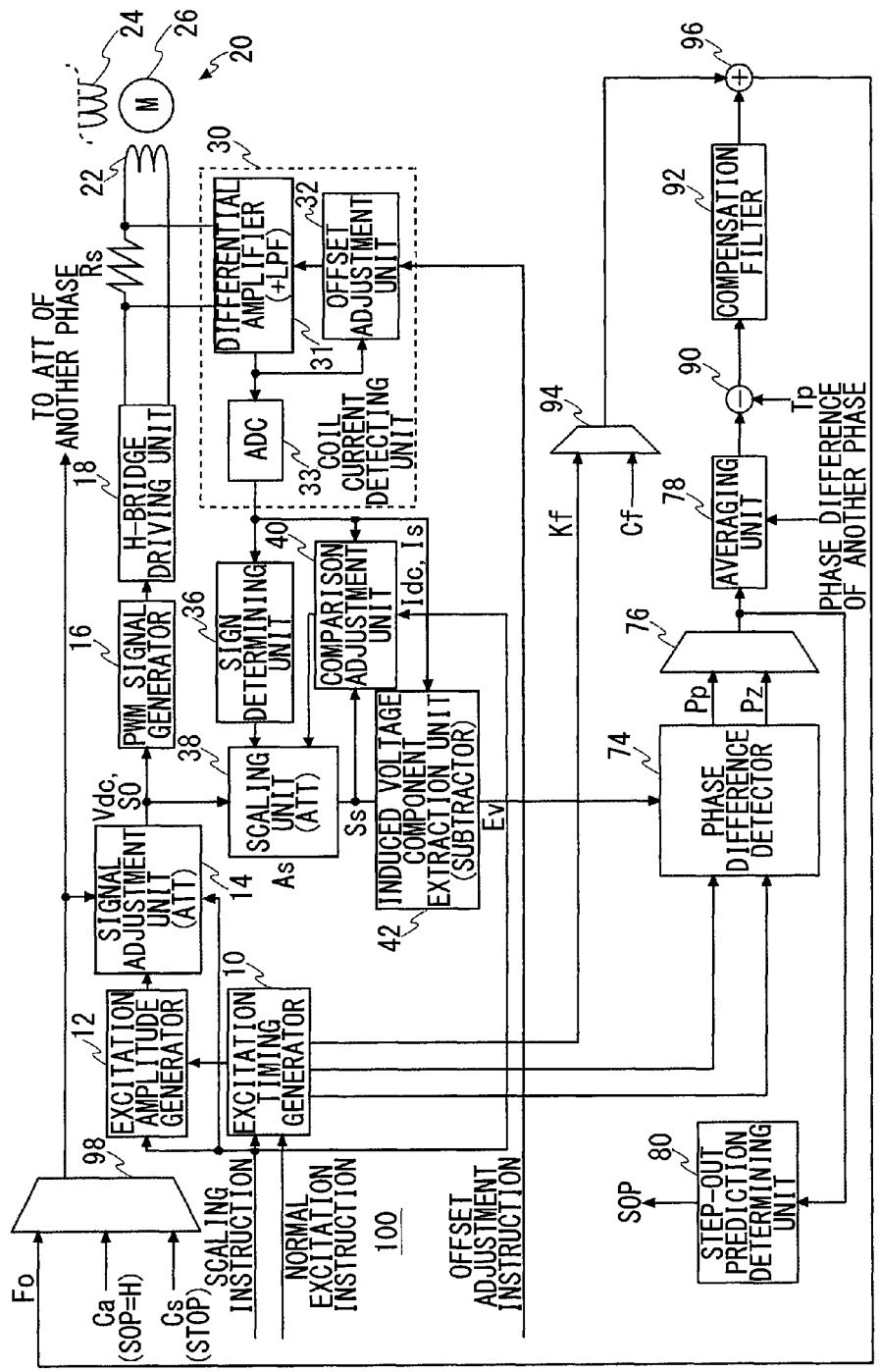
FIG. 12 illustrates a modification of the motor drive circuit shown in FIG. 11.

FIG. 12 illustrates a modification of the motor drive circuit 100 shown in FIG. 11. A motor drive circuit 100 shown in FIG. 12 is of such a configuration that an averaging unit 78 is added to the motor drive circuit 100 of FIG. 11. The averaging unit 78 is inserted between the selector 76 and the subtractor 90. In this modification, the phase difference of the coil of another phase (the second coil 24 in the present embodiment) is detected as well. Though omitted in FIG. 12, the same circuit element as that for detecting the phase difference of the first coil 22 is provided separately for the detection of the phase difference of the second coil 24.

The motor drive circuit 100 shown in FIG. 12 detects the phase difference of the first coil 22 and the phase difference of the coil of another phase (the second coil 24 in the present embodiment) and adjusts the drive signal S0 of the first coil 22 and the drive signal of the coil of another phase (the second coil 24 in the present embodiment) so that an average value of these phase differences is brought close to the target phase difference Tp. The phase difference of the first coil 22 and the phase difference of the second coil 24 is averaged by the averaging unit 78.

If the phase difference of the first coil 22 and the phase difference of the second coil 24 are detected and their drive signals are adjusted independently, the current ratio between the first coil 22 and the second coil 24 will be lost or disturbed. In the case of 2-phase motor as in the present embodiment, the timing of the phase difference detection is almost identical at each phase. Thus, there is provided a window for loading the phase difference of the coil of another phase into the averaging unit 78. With this window, the phase difference of the first coil 22 and the phase difference of the second coil 24 are averaged and then the common control signal F0 is supplied to the signal adjustment units of the first coil 22 and the second coil 24 in a common feedback system. As a result, it is possible to perform the feedback control with the responses from the both phases taken into consideration and also without losing the current ratio between the first coil 22 and the second coil 24.

Figure 13:
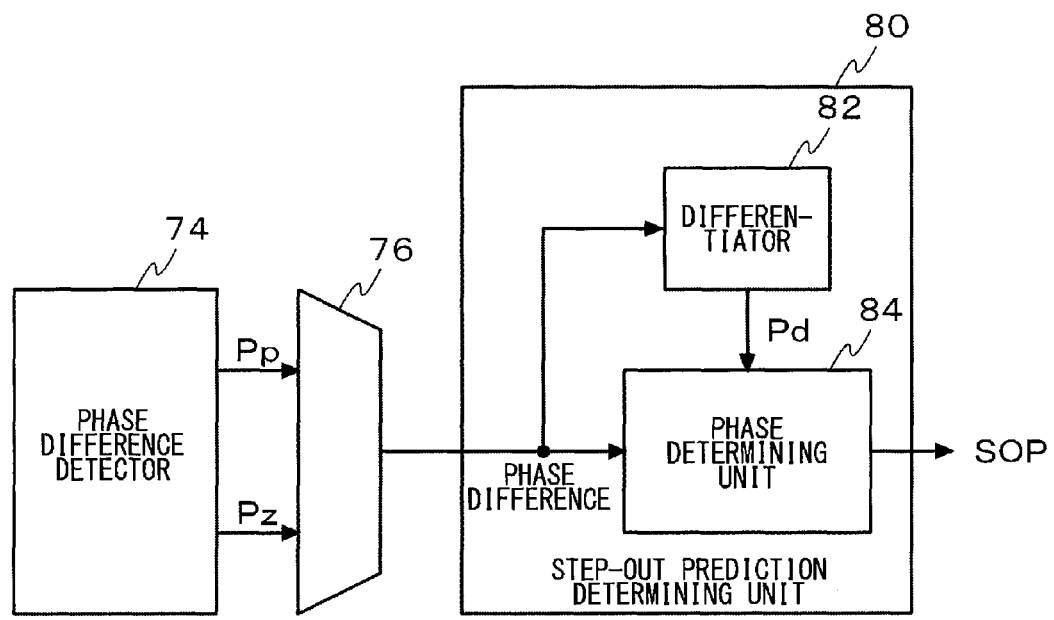
FIG. 13 illustrates a structure of a step-out prediction determining unit.

FIG. 13 illustrates a structure of the step-out prediction determining unit 80. The step-out prediction determining unit 80 includes a differentiator 82 and a phase determining unit 84. The phase difference is inputted to the differentiator 82 and the phase determining unit 84, from the phase difference detector 74 via the selector 76. The differentiator 82 differentiates the inputted phase difference, produces a phase difference differential value Pd, and outputs it to the phase determining unit 84.

Figure 14:
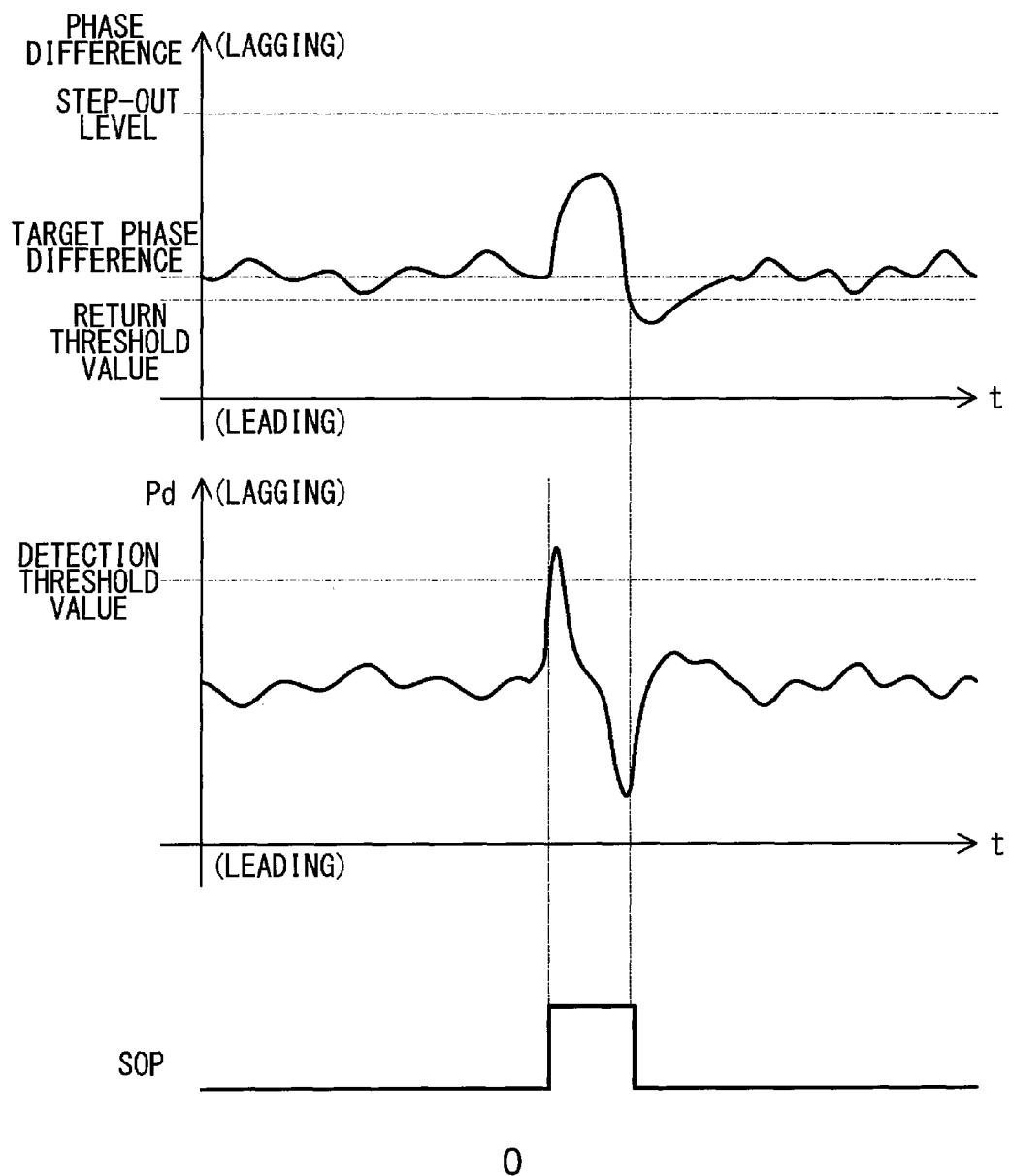
FIG. 14 is a timing chart showing an exemplary operation of a phase determining unit.

FIG. 14 is a timing chart showing an exemplary operation of the phase determining unit 84. The phase determining unit 84 compares the phase difference differential value Pd supplied from the differentiator 82 against the detection threshold value for use in the prediction of loss-of-synchronization. When the phase difference differential value Pd exceeds the detection threshold value in a phase-lagging direction, a step-out prediction signal SOP is set to a high level. After this, the phase determining unit 84 compares the phase difference inputted from the phase difference detector 74 via the selector 76 against a return threshold value. When the phase difference exceeds the return threshold value in a phase leading direction, the step-out prediction signal SOP is set to a lower level.

A period during which the step-out prediction signal SOP goes high indicates that there is a high risk of loss-of-synchronization occurring. A designer or user may set the detection threshold value and the return threshold value based on a desired step-out prediction sensitivity.

Now refer back to FIG. 11 and FIG. 12. While the step-out prediction signal SOP goes high, the selector 98 selects a step-out prediction time setting value Ca and supplies the step-out prediction time setting value Ca to the signal adjustment unit 14. The step-out prediction time setting value Ca is set to a value which is necessary and sufficient to cause a large torque in the stepping motor 20. Thus, the step-out prediction time setting value Ca is a value greater than or equal to the stop set value Cs.

For a period during which the step-out prediction time setting value Ca is supplied (namely, the step-out prediction signal SOP goes high), the signal adjustment unit 14 adjusts the drive signal S0 in such a manner as to increase the current flowing through the first coil 22. More specifically, the amplitude of the drive signal S0 is increased.

As the supply of the step-out prediction time setting value Ca is terminated (namely, the step-out prediction signal SOP returns to a low level), the signal adjustment unit 14 terminates the adjustment of the drive signal S0. The processing performed while the signal adjustment unit 14 receives the supply of the control signal F0 or stop set value Cs is as described. In this manner, the loss-of-synchronization, at the time there is a large change in the load relative to the torque generated, is predicted by the prediction determining processing performed by the step-out prediction determining unit 80, so that the loss-of-synchronization can be avoided.

As described above, by employing the present embodiments, the stepping motor can be driven highly efficiently and achieved at low cost by performing a feedback control so that the phase difference between the "drive signal after the scaling" Ss and the speed electromotive voltage component Ev is brought close to the target phase difference Tp. As compared with a method in which the position of the rotor is estimated using the vector operation, the circuitry can be significantly simplified. Also, since an object of the feedback control is the amplitude of the drive signal S0, the circuit elements involved in the feedback system can be simplified. Also, as compared with a method in which the speed electromotive voltage is detected only during a high impedance state, the speed electromotive voltage component is detected without losing the continuity of current and therefore the drive noise can be reduced.

Also, the target phase difference is set in a range between +90 degrees and 0 degree, so that the power consumption can be reduced. Also, while the rotor 26 stops, the feedback control is stopped and the drive signal S0 is controlled by another set value. Thus, a sufficient degree of precision of stop position can be assured. This means that the required reduction in the power consumption and the demand for the assured precision of stop position are both met.

Also, observing the differential value of the phase difference allows the prediction of loss-of-synchronization. In particular, a loss-of-synchronization caused by a sudden change in the load can be predicted. If it is predicted that there is a high risk of loss-of-synchronization, the drive signal S0 is so controlled as to increase the torque. As a result, the loss-of-synchronization can be avoided. In such a case, the torque is increased by adjusting the amplitude of the drive signal S0, so that the circuit elements involved in a configuration to avoid the loss-of-synchronization can be simplified. Also, many of those circuit elements and the circuit elements involved in the feedback control system can be put to a common use.

The description of the present invention given above is based upon illustrative embodiments and modifications. These embodiments and modifications are intended to be illustrative only and it will be obvious to those skilled in the art that various modifications to constituting elements and processes could be further developed and that such additional modifications are also within the scope of the present invention.

What is claimed is:

1. A motor drive circuit, comprising:
   a driver unit configured to supply current to a coil of a synchronous motor in response to a drive signal;
   a coil current detector configured to detect a current component flowing through the coil;
   a scaling unit configured to scale the drive signal;
   an induced voltage component extraction unit configured to extract an induced voltage component by removing the drive signal, scaled by said scaling unit, from the coil current component detected by said current detector;
   a phase difference detector configured to detect a phase difference between the phase of the drive signal and that of the induced voltage component; and
   a drive signal adjustment unit configured to adjust the drive signal so that the phase difference detected by said phase difference detector is brought close to a target phase difference.

2. A motor drive circuit according to claim 1, wherein said scaling unit scales the drive signal using a scaling factor that defines a relation between the drive signal in a state where an induced voltage occurring in the coil is zero and the coil current component detected by said coil current detector.

3. A motor drive circuit according to claim 2, wherein said drive signal adjustment unit adjusts the amplitude of the drive signal.

4. A motor drive circuit according to claim 2, wherein the synchronous motor is a stepping motor, and
   wherein the target phase difference is set such that the phase of the induced voltage component is within positive 90 degrees through 0 degree relative to the phase of the scaled drive signal.

5. A motor drive circuit according to claim 2, wherein the synchronous motor is a stepping motor, and
   wherein when a rotor included in the stepping motor moves from a stop position to the next stop position, said drive signal adjustment unit adjusts the drive signal so that the phase difference is brought close to the target phase difference, and
   while the rotor stops at a stop position, said drive signal adjustment unit ceases to adjust the drive signal.

6. A motor drive circuit according to claim 2, wherein the synchronous motor is a stepping motor that includes a first coil and a second coil, and
   wherein said motor drive circuit detects the phase difference in the first coil, and adjusts a drive signal of the first coil and a drive signal of the second coil so that the phase difference in the first coil is brought close to the target phase difference.

7. A motor drive circuit according to claim 2, wherein the synchronous motor is a stepping motor that includes a first coil and a second coil, and
   wherein said motor drive circuit detects the phase difference in the first coil and the phase difference in the second coil, and adjusts a drive signal of the first coil and a drive signal of the second coil so that an average value of the phase difference in the first coil and the phase difference in the second coil is brought close to the target phase difference.

* * * * *